United States Patent
Coupard et al.

(10) Patent No.: US 7,932,205 B2
(45) Date of Patent: Apr. 26, 2011

(54) PROCESS FOR THE PREPARATION OF MULTIMETALLIC CATALYSTS THAT CAN BE USED IN REACTIONS FOR TRANSFORMATION OF HYDROCARBONS

(75) Inventors: Vincent Coupard, Vaulx en Velin (FR); Denis Uzio, Belleville (FR); Carine Petit-Clair, Montesson (FR); Lars Fischer, Seysuel (FR); Frederic Portejoie, Mornant (FR)

(73) Assignee: IFP, Rueil Malmaison Cedex (FR)

( * ) Notice: Subject to any disclaimer, the term of this patent is extended or adjusted under 35 U.S.C. 154(b) by 727 days.

(21) Appl. No.: 11/638,351

(22) Filed: Dec. 14, 2006

(65) Prior Publication Data
US 2007/0191651 A1 Aug. 16, 2007

Related U.S. Application Data

(63) Continuation of application No. PCT/FR2006/000326, filed on Feb. 10, 2006.

(30) Foreign Application Priority Data

Feb. 25, 2006 (FR) .................................... 05 01967

(51) Int. Cl.
*B01J 23/00* (2006.01)
*B01J 21/00* (2006.01)
*B01J 20/00* (2006.01)

(52) U.S. Cl. ........ 502/104; 502/111; 502/113; 502/244; 502/245; 502/326; 502/327; 502/330; 502/331; 502/332; 502/333; 502/334; 502/339; 502/355; 502/415; 502/439

(58) Field of Classification Search .................. 502/326, 502/327, 330, 331, 332, 333, 334, 339, 355, 502/415, 439, 104, 111, 113, 244, 245
See application file for complete search history.

(56) References Cited

U.S. PATENT DOCUMENTS

| | | | | |
|---|---|---|---|---|
| 3,554,929 A * | 1/1971 | Aarons | ......................... | 502/178 |
| 3,804,779 A * | 4/1974 | Kent et al. | ...................... | 502/185 |
| 4,524,051 A * | 6/1985 | Wright et al. | .............. | 423/437.2 |
| 4,588,705 A * | 5/1986 | Vanderspurt et al. | ......... | 502/177 |
| 4,590,177 A * | 5/1986 | Richard et al. | ................ | 502/328 |
| 5,641,723 A * | 6/1997 | Bonnemann et al. | ......... | 502/326 |
| 5,908,806 A * | 6/1999 | Kharas | ............................ | 502/64 |
| 5,939,220 A * | 8/1999 | Gunner et al. | .................... | 429/40 |
| 5,977,012 A * | 11/1999 | Kharas et al. | ................. | 502/326 |
| 6,060,121 A * | 5/2000 | Hidber et al. | ................. | 427/261 |
| 6,090,746 A * | 7/2000 | Bonnemann et al. | ......... | 502/325 |
| 6,127,300 A * | 10/2000 | Kharas et al. | ................... | 502/62 |
| 6,197,720 B1 * | 3/2001 | Heineke et al. | ................ | 502/325 |
| 6,214,890 B1 * | 4/2001 | Roy et al. | ...................... | 518/715 |
| 6,235,677 B1 * | 5/2001 | Manzer et al. | ................ | 502/232 |
| 6,686,308 B2 * | 2/2004 | Mao et al. | ..................... | 502/180 |
| 7,341,976 B2 * | 3/2008 | Espinoza et al. | ............. | 502/327 |
| 2004/0127352 A1 * | 7/2004 | Jin et al. | ........................ | 502/332 |
| 2007/0207921 A1 * | 9/2007 | Sijpkes et al. | ................ | 502/338 |

* cited by examiner

*Primary Examiner* — Cam N Nguyen

(74) *Attorney, Agent, or Firm* — Millen, White, Zelano & Branigan, P.C.

(57) ABSTRACT

The invention relates to a process for the preparation of a catalyst comprising:
a) The preparation of a colloidal oxide suspension of a first metal M1 that consists in the neutralization of a basic solution by an acidic mineral solution that contains the precursor of the metal M1,
b) Bringing into contact the precursor of the promoter M2, either directly in its crystallized form or after dissolution in aqueous phase, with the colloidal suspension that is obtained in stage a),
c) Bringing into contact the colloidal suspension that is obtained in stage b) with the substrate,
d) Drying at a temperature of between 30° C. and 200° C., under a flow of air.

The invention also relates to a process for the treatment of an olefinic fraction that uses the catalyst prepared [by] said preparation process.

8 Claims, No Drawings

US 7,932,205 B2

PROCESS FOR THE PREPARATION OF MULTIMETALLIC CATALYSTS THAT CAN BE USED IN REACTIONS FOR TRANSFORMATION OF HYDROCARBONS

This application is a continuation of International Application PCT/FR06/00326 filed Feb. 10, 2006, which claims benefit of priority from French Application 05/01.967 filed Feb. 25, 2005.

The processes for conversion of hydrocarbons, such as vaporeforming or catalytic cracking, are performed at high temperature and produce a large variety of unsaturated molecules, such as ethylene, propylene, linear butenes, isobutene and pentenes. By the same token, polyunsaturated compounds that contain the same carbon number are also formed: acetylene, propadiene and methyl acetylene (or propyne), 1-2 and 1-3 butadiene, vinyl acetylene and ethyl acetylene, and finally other compounds with a boiling point that corresponds to the gasoline fraction (C5+). All of these compounds should be eliminated to make possible the use of these different fractions in the petrochemistry processes such as the polymerization units. Thus, the C2 steam-cracking fraction has the following mean volumetric composition: 1.2% by weight of acetylene, 83.5% by weight of ethylene and 15.3% by weight of ethane. For the C3 fraction, the same type of distribution with a predominance of propylene (90% by weight) and contents of propadiene and methyl acetylene on the order of 3 to 8% by weight are found. The specifications that relate to the concentrations of these polyunsaturated compounds for the petrochemistry and polymerization units are very low: 20-30 ppm of MAPD (methyl acetylene and propadiene) for the propylene chemical quality and less than 10 ppm, and Pd—Cu (U.S. Pat. No. 5,464,802), Pd—Ag (U.S. Pat. No. 4,547,600), Pd—Sn and Pd—Pb (JP59227829) or else a combination of Pd and an alkaline metal (EP0722776) have been identified for their hydrogenation performances.

In general, these bimetallic effects are linked to the interaction created between the two elements. It thus appears that the identification of a multimetallic catalytic system is conditioned by the establishment of this interaction.

Among the methods that make it possible to control the characteristics of the bimetallic particles (composition, size), it is possible to cite the methods of surface-controlled reactions (US20020045544, J. Barbier, J. M. Dumas, C. Geron, H. Hadrane Appl. Catal 179, 1994, 116 (1-2), S. Szabo, I. Bakos, F. Nagy, T. Mallat, J. Electroanal. Chem. 1989, 263, 137) that employ in particular phenomena of surface oxidation-reduction.

This invention describes a catalyst and a method for the preparation of substrate multimetallic catalysts for which the size, the composition as well as the distribution of the bimetallic particles in the substrate balls are adapted to the requirements of the selective hydrogenation reactions. Actually, it is known to one skilled in the art that for the hydrogenation reactions of polyunsaturated molecules, such as the diolefins or the acetylene molecules, the reaction speed depends on the size of the metallic particles: this result is generally described under the term "sensitivity to the structure." An optimum is generally observed for a size on the order of 3 to 4 nm, whereby this value can vary based on, in particular, the molecular weight of the reagents (M. Boudart, W. C. Cheng, J. Catal. 106, 1987, 134, S. Hub, L. Hilaire, R. Touroude, Appl. Catal. 36 1992, 307).

It is thus essential to obtain a particle size distribution (criterion 1) centered on the optimum value as well as a minimum dispersion around this value.

The identification of the bimetallic pairs was the object of numerous works in the area of selective hydrogenation reactions (V. Ponec, G. C. Bond, Catalysis of Metal and Alloys, Elsevier, Amsterdam, 1995). These studies also revealed the difficulty in obtaining the desired synergy effect, whereby this effect depends on the method of synthesis selected. Thus, the local composition (criterion 2) of the active phase plays a key role in reaching high catalytic performance levels. Whereby the yields that are obtained are the result of the transformations that occur on each particle, the composition of the latter should be adjusted to the optimum formulation and the particles should be homogeneous with one another.

Finally, the macroscopic distribution of elements in the substrate balls (criterion 3) also constitutes an important criterion, primarily within the framework of rapid and consecutive reactions such as the selective hydrogenations. In this case, it is preferable to deposit the elements in a fine crown at the periphery of the substrate grains so as to avoid the problems of intragranular material transfer that can lead to a lack of activity and a loss of selectivity.

It is particularly difficult to respect these three criteria simultaneously, and in general the works that make it possible to produce such catalysts propose using very sophisticated preparation techniques that cannot be extrapolated on the scales required for industrial production (Rousset, J. L., Stievano, L., Cadete Santos Aires, F. J., Geantet, C., Renouprez, A. J., Pellarin, M., J. Catal., 197(2) 2001 335).

The methods of impregnation in excess (volume of solution to be impregnated greater than the pore volume of the substrate mass) or impregnation in the dry state (volume of solution corresponding to the pore volume of the substrate mass) of acid solutions of metallic precursors make it possible to vary the size and the overall composition. However, on the local scale of the particles, these parameters often remain very heterogeneous. The use of organometallic precursors makes it possible to obtain catalysts that are homogeneous in composition on the scale of the particles, but, in this case, the size of the particles is generally small (less than one nanometer), or, for larger particles, the size distribution around this mean value is broad. In addition, these precursors are used in organic solvents that are unfavorable from an environmental standpoint.

There is therefore described here a new way of preparing bimetallic catalysts that meet the three above-mentioned criteria.

SUMMARY OF THE INVENTION

The invention relates to a process for the preparation of a catalyst that comprises at least one metal M1 and a promoter M2 on a substrate, whereby said process comprises at least the following stages:

a) The preparation of a colloidal oxide suspension of a first metal M1 that consists in the neutralization of a basic solution by an acidic mineral solution that contains the precursor of the metal M1, b) Bringing into contact the precursor of the promoter M2, either directly in its crystallized form or after dissolution in aqueous phase, with the colloidal suspension that is obtained in stage a), c) Bringing into contact the colloidal suspension that is obtained in stage b) with the substrate, d) Drying at a temperature of between 30° C. and 200° C., under a flow of air.

The invention also relates to a process for the treatment of an olefinic fraction that uses the catalyst that is prepared according to one of the preceding claims. Said olefinic fraction is preferably a light olefinic fraction that primarily contains hydrocarbons with 3, 4 or 5 carbon atoms.

DETAILED DESCRIPTION

This invention describes a substrate bimetallic catalyst and its process for production making it possible to prepare catalysts whose particles are characterized by a small size distribution, a homogeneous composition on the scale of the particles, and a macroscopic distribution in a ring in the substrate balls. A preferred manner of carrying out this preparation is as follows: the synthesis comprises the preparation of the solution containing the bimetallic precursors and then the deposition on the substrate. A colloidal oxide suspension of the first metal M1 is synthesized in the first stage (stage a) by partial neutralization of a basic solution that contains, for example, an alkaline (soda, potash, . . . ) or ammonia by an acidic mineral solution that contains the precursor of the metal M1. The promoter M2 is brought into contact in a second stage (stage b) with the colloidal suspension of the metal M1 or in dissolved form in an aqueous solution or directly in crystallized form.

In a third stage (stage c), the solution that contains the two metals is finally brought into contact with the substrate, preferably in a controlled manner, for example by means of a spraying system. The solution can undergo a maturation stage for a variable period (from several minutes to several hours, preferably 1 or 2 hours) at variable temperatures (preferably 20° C. to 100° C., more preferably 20° C. to 80° C.). In a subsequent stage (stage d), the catalyst is dried under a flow of air so as to evacuate the water that is contained in the pores, then optionally calcined during a stage e under a flow of air at temperatures of between 100 and 600° C., preferably between 150 and 500° C., and even more preferably between 200 and 450° C. The solid is generally reduced under a flow of hydrogen before its use in catalysis so as to convert the metallic elements in their reduced form. An in-situ reduction (i.e., in the reactor) is possible.

Bringing the impregnation solution into contact with the substrate can be carried out by impregnation in the dry state or by impregnation in excess in static or dynamic mode. The addition of stabilizers (anionic surfactants, cationic or nonionic surfactants, ions, polymers) can advantageously be carried out so as to increase the stability of the colloidal suspensions. For example, compounds such as sulfobetaine, polyacrylate, dodecyl sodium sulfate or else polyethylene glycol can be used without this list being exhaustive. This addition can be made either before the first stage of the preparation of the solution or after the second stage before the impregnation on the substrate.

The metal M1 is selected from among the elements from groups 8, 9 and 10 of the new periodic table (CRC Handbook of Chemistry and Physics [Manuel CRC de Chimie et Physique], 81$^{st}$ Edition, 2000-2001, CRC Press, Editor David R. Lide, cover pages), preferably M1 is a noble metal, more preferably palladium or platinum.

The promoter M2 is selected from among the elements from groups 8, 9, 10, 13 and 14. A first list of preferred promoters M2 consists of: nickel, copper, silver, gold, indium, tin and germanium.

Said promoter M2, when it is selected from among the elements from groups 8, 9, 10, is preferably different from metal M1. More preferably, the promoter M2 is selected from among the elements from groups 11, 13 and 14, more preferably from among the elements from groups 13 and 14, and very preferably the promoter M2 is indium or tin.

The content of metal M1, preferably selected from among the elements from groups 8, 9 or 10 of the new periodic table, is preferably between 0.01 and 5% by weight, more preferably between 0.05 and 3% by weight, and even more preferably between 0.1 and 1% by weight. The content of promoter element M2 is preferably between 0.5 and 10% by weight, preferably between 0.05 and 5% by weight, and even more preferably between 0.1 and 4% by weight.

The substrate of the catalyst according to the invention comprises at least one refractory oxide that is generally selected from among the oxides of metals from the groups 2, 3, 4, 13 and 14 of the new periodic table, such as, for example, the oxides of magnesium, aluminum, silicon, titanium, zirconium, or thorium, taken by themselves or mixed with one another or mixed with other metal oxides of the periodic table. It is also possible to use carbon. The zeolites or molecular sieves such as X, Y, mordenite, faujasite, ZSM-5, ZSM-4, ZSM-8, etc., as well as the mixtures of metal oxides selected from among the metals from the groups 2, 3, 4, 13 or 14 with a zeolitic material can also be suitable as well as the amorphous mesoporous silicic substrates of the MCM or SBA family. The preferred substrate is an alumina and more particularly an alumina with a specific surface area of between 5 and 200 m$^2$/g, preferably 10 to 150 m$^2$/g, and even more advantageously 20 to 140 m$^2$/g.

Before use, the catalyst is generally activated by a treatment under a flow of hydrogen at a temperature of between the ambient temperature and about 500° C., preferably between 100 and 400° C. This treatment can be carried out in the reactor even where the catalytic reaction will be carried out (in-situ reduction) or previously in independent equipment (off-site or ex-situ reduction).

The process for the treatment of the olefinic fractions according to the invention comprises bringing said fraction into contact under suitable conditions with the catalyst that is prepared by means of the process for preparation according to the invention described above. The treated feedstocks are light olefinic fractions that contain primarily 3 to 5 carbon atoms (fractions that comprise C3, C4 and C5 hydrocarbons) taken independently after fractionations or in a mixture (C3+C4+C5, C3+C4, or else C4+C5).

The high selectivities can be obtained by different means: the adjustment of operating conditions (temperature, hydrogen/polyunsaturated compounds ratio), the optimization of the hydrodynamic conditions but primarily by adjusting the catalytic formulation.

The process for the treatment of an olefinic fraction according to the invention is preferably a selective hydrogenation process. According to the invention, the treatment of the olefinic fraction is generally carried out under pressure in a liquid or gas phase, in the presence of an amount of hydrogen in slight excess relative to the stoichiometric value that makes possible the hydrogenation of diolefins and acetylene compounds. The hydrogen and the feedstock are injected in upward or downward flow in a fixed-bed reactor whose temperature is between 10° C. and 200° C. The pressure is generally adequate to keep at least 80% by weight of the feedstock to be treated in the liquid phase at the inlet of the reactor. It is generally between 0.4 and 5 MPa, more advantageously between 1 and 3 MPa. The hourly volumetric flow rate (defined as the ratio of the volumetric flow rate of the hydrocarbon feedstock to the catalyst volume) established under these conditions is generally between 1 and 50 h$^{-1}$, and preferably between 5 and 40 h$^{-1}$, and even more preferably between 10 and 30 h$^{-1}$.

The process of the invention can also be used according to different technologies, such as, for example, the implantation of the catalyst in a distillation column or in reactor-exchangers.

The following non-limiting examples illustrate the invention.

EXAMPLE 1

Catalyst A (PdSn, for Comparison)

A catalyst A is prepared by a conventional method of double impregnation in the dry state of acid solutions that contain the molecular precursors of palladium and tin. 100 cm$^3$ of a solution that contains 0.3 g of palladium (example: palladium nitrate) and 0.3 g of tin (example: SnCl$_4$, 5H$_2$O) is added successively drop by drop to 100 g of alumina substrate with a specific Surface area of 120 m$^2$/g, with a pore volume equal to 1 cm$^3$/g and with a grain size of between 2.4 and 4 mm, centered on 3 mm. The substrate is dried intermediately at 120° C. between the two impregnation stages. After a final drying stage in a flushed bed under a flow of air, the final catalyst contains 0.3% by weight of palladium and 0.3% of tin.

EXAMPLE 2

Catalyst B (Pd—Sn, According to the Invention)

A catalyst B is prepared by bringing into contact a bimetallic colloidal solution, a solution itself prepared in two stages:
  Partial neutralization of 20 cm$^3$ of a 10N solution of sodium hydroxide by 20 cm$^3$ of a palladium nitrate solution containing 1.5 g of palladium per liter
  Addition of 0.28 g of tin, example SnCl$_4$, 5H$_2$O crystallized in the preceding colloidal suspension.

After the volume is adjusted, the solution is then poured into 100 g of the same substrate as for Example 1. The catalyst is finally dried at 120° C. for 2 hours under a flow of air of 50 l/h. It contains 0.3% by weight of palladium and 0.28% by weight of tin.

EXAMPLE 3

Catalyst C (Pd—Sn, for Comparison)

A catalyst C is prepared by a first impregnation stage with a pore volume of the substrate of Example 1 by a basic tin solution (example SnCl$_4$, 5H$_2$O) followed after a drying at 120° C. by a second impregnation with a pore volume by a palladium nitrite solution Pd (NO$_2$)$_4^{2-}$, itself prepared by the addition of sodium nitrite to a palladium nitrate acid solution. The catalyst, finally dried and activated as above, contains 0.3% by weight of palladium and 0.3% by weight of tin.

EXAMPLE 4

Catalyst D (Pd—In, According to the Invention)

A catalyst D is prepared according to the same operating procedure as in Example 2 by replacing the precursor SnCl$_4$, 5H$_2$O by InCl$_3$. The catalyst, finally dried and activated as above, contains 0.3% by weight of palladium and 0.3% by weight of indium.

EXAMPLE 5

Catalyst E (Pd—Sn, for Comparison According to Patent US2001 0036902)

A catalyst E is prepared by impregnating a colloidal suspension that contains palladium and tin. This solution is prepared by adding the following to a soda solution at pH=14: 0.3 g of SnCl$_2$, 2H$_2$O and then 20 cm$^3$ of an acid solution that contains palladium nitrate initially at pH=0.8. The final catalyst contains 0.3% by weight of tin and 0.3% by weight of palladium. The electron microscopy analysis shows a mean particle size of 3 nm with a standard deviation of 0.5. The size distribution is in accordance with the invention. By contrast, the bimetallicity number is low (50%).

EXAMPLE 6

Catalyst F (Pd Ni, According to the Invention)

A catalyst F is prepared by bringing into contact a bimetallic colloidal solution prepared according to the following stages:
  Partial neutralization of 100 ml of 5N sodium hydroxide solution by 100 cm$^3$ of nickel nitrate (Ni(NO$_3$)$_2$, 6H$_2$O) at 150 gNi/l).
  Addition of 0.6 g of palladium in Pd(NO$_3$)$_2$ form to the preceding colloidal suspension.

After adjustment of the volume, the solution is then poured into 200 g of the same substrate as for Example 1. The catalyst is finally dried at 120° C. for 2 hours under a flow of air of 50 l/h, and it contains 7.5% by weight of Ni and 0.3% by weight of Pd.

EXAMPLE 7

Catalyst G (Pd Ag, According to the Invention)

A catalyst G is prepared by bringing into contact a bimetallic colloidal solution that is synthesized according to the following stages:
  Dissolution, in 100 cm$^3$ of 5N sodium hydroxide solution, of 45 ml of palladium nitrate at 8.5 gPd/l.
  Addition of 0.6 g of silver in the form of silver nitrate to the preceding colloidal suspension.

After adjustment of the volume, the solution is then poured into 150 g of the same substrate as in Example 1. The catalyst is finally dried at 120° C. for 2 hours under a flow of air of 50 l/h, and it contains 0.4% by weight of silver and 0.25% by weight of palladium.

EXAMPLE 8

Characterization

Table 1 combines the characteristics of the different catalysts in terms of mean size, size distribution through the standard deviation ($\sigma$) around this mean value, macroscopic distribution in the substrate, and finally bimetallicity number. The mean size and the standard deviation ($\sigma$) around this mean size $$\left(\sigma = \sqrt{\frac{\sum_t n_i X_i^2}{\sum_t n_i} - \left(\sum_t n_i X_i\right)^2} \text{ with } n_i \text{ samples of size } X_i\right)$$

with ni samples of size Xi) are determined by measurements in Transmission Electron Microscopy (TEM) on a representative particle population. The Castaing microprobe analysis makes it possible to determine the % by weight of metal present in a substrate ring of between R and 0.9 R, whereby R is the radius of the ball (or the extrudate). The bimetallicity number is also determined by TEM or preferably STEM (Scanning Transmission Electron Microscopy) equipped with an x-ray energy dispersion spectrometer also named EDS or EDX (Energy Dispersive Spectroscopy). It corresponds to the percentage of particles for which the two metallic elements have been detected with a confidence criterion (probability) of 95%. This number is calculated from a statistical analysis on a representative population of particles.

TABLE 1

Characteristics of Different Catalysts.

| Catalyst | % by Weight in a Ring Encompassed in R and 0.9 R | | Mean Size of the Palladium Particles (nm) | Standard Deviation σ | Bimetallicity Number % |
|---|---|---|---|---|---|
| | Sn | Pd | | | |
| A | 40 | 43 | 1.8 | 2.5 | 30 |
| B | 81 | 82 | 1.8 | 0.4 | 90 |
| C | 22 | 12 | 3.3 | 1.8 | 85 |
| D | 72 | 69 | 1.9 | 0.7 | 91 |
| E | 80 | 85 | 3 | 0.6 | 50 |
| F | 70 (Ni) | 80 | 3.5 | 0.5 | 95 |
| G | 86 (Ag) | 83 | 2.1 | 0.6 | 92 |

EXAMPLE 9

Catalytic Tests on the C3 Steam-Cracking Fraction

A feedstock that comprises 93.43% by weight of propylene, 3.77% by weight of propane, 1.55% by weight of methyl acetylene, and 1.29% by weight of propadiene is treated on the different catalysts presented above. Before reaction, the hydrogenation catalysts are activated under a flow of hydrogen at 150° C. for 2 hours. 20 cm³ of each catalyst is placed in a tubular reactor in upflow mode. The operating conditions are $P_{tot}=35$ bar, $T=25°$ C., VVH=20 h$^{-1}$, and the H$_2$/MAPD ratio varies between 1 and 2 mol/mol. The composition of the feedstock and effluents is followed by gas phase chromatography. The performance levels are expressed by the ratio of $[C_3^={}_{effluent}-C_3^={}_{feedstock}]/[MAPD_{effluent}-MAPD_{feedstock}]$, which represents the selectivity of the catalyst based on the MAPD residual content (MAPD=% by weight of methyl acetylene+% by weight of propadiene).

TABLE 2

$[C_3^={}_{effluent} - C_3^={}_{feedstock}]/[MAPD_{effluent} - MAPD_{feedstock}]$ Hydrogenation Selectivities of a C3 Steam-Cracking Fraction for an [MAPD] Residual Content of 10 ppm in the Effluents.

| Catalyst | Selectivity |
|---|---|
| A | −10 |
| B | 69 |
| C | 2 |
| D | 58 |
| E | 30 |
| F | 45 |
| G | 55 |

EXAMPLE 10

Hydrogenation of a C4 Model Feedstock (Butadiene)

The hydrogenating properties of the different catalysts are evaluated here in a "Grignard"-type perfectly-stirred discontinuous test. Two grams of palladium-based catalyst are finely ground (63-100 μm), reduced for 2 hours at 200° C. under a stream of pure hydrogen, then transferred under cover gas into the hydrogenation reactor. The feedstock that is to be hydrogenated is a mixture that contains 12 g of diolefin (butadiene) that is diluted in 180 cm³ of n-heptane.

The temperature of the test is maintained at 20° C. and the pressure at 1 MPa. The results are summarized in Table 3. The composition of the effluents is followed by chromatographic analysis. The hydrogenating activity is expressed in mol min$^{-1}$ g$_{Pd}^{-1}$. The selectivity is expressed by the ratio of the initial hydrogenation speed of the diolefin to that of the external olefin (butene-1).

TABLE 3

Catalytic Hydrogenation Performance Levels of Butadiene-1,3.

| | Catalyst | | | | | | |
|---|---|---|---|---|---|---|---|
| | A | B | C | D | E | F | G |
| Activity (mol · min$^{-1}$ · g$_{Pd}^{-1}$) | 5.7 | 6.7 | 4.5 | 5.1 | 7.1 | 6.9 | 5.2 |
| Selectivity | 1.2 | 3.6 | 2.8 | 3.2 | 2.3 | 3.1 | 3.8 |

The invention claimed is:

1. A process for the preparation of a catalyst comprising at least one metal M1 and a promoter M2 on a substrate, said process comprising:
   a) preparing a colloidal oxide suspension of a first metal M1 by neutralization of a basic solution by an acidic mineral solution that contains a precursor of the metal M1,
   b) contacting a precursor of the promoter M2, either directly in crystallized form or after dissolution in aqueous phase, with the colloidal suspension obtained in a),
   c) contacting a colloidal suspension obtained in b) with the substrate, and
   d) drying at a temperature of between 30° C. and 200° C., under a flow of air, wherein promoter M2 is an element selected from groups 11, 13 or 14 of the periodic table.

2. The process for preparation according to claim 1, further comprising, after drying (d), (e) calcining under a flow of air at temperatures of between 100 and 600° C.

3. The process according to claim 1, wherein the metal M1 is a metal from groups 8, 9 or 10 of the periodic table.

4. The process according to claim 3, wherein the metal of groups 8, 9 or 10 is a noble metal.

5. The process according to claim 1, wherein the metal M1 is platinum and the promoter precursor M2 is copper, silver, gold, indium, tin or germanium.

6. The process according to claim 1, wherein the substrate comprises at least one refractory oxide which is an oxide of metals selected from groups 2, 3, 4, 13 or 14 of the periodic table.

7. The process according to claim 1, wherein the substrate is an alumina of a specific surface area of between 5 and 200 m²/g.

8. A process for the preparation of a catalyst comprising at least one metal M1 and a promoter M2 on a substrate, said process comprising:

a) preparing a colloidal oxide suspension of a first metal M1 by neutralization of a basic solution by an acidic mineral solution that contains a precursor of the metal M1, b) contacting a precursor of the promoter M2, either directly in crystallized form or after dissolution in aqueous phase, with the colloidal suspension obtained in a), c) contacting a colloidal suspension obtained in b) with the substrate, and d) drying at a temperature of between 30° C. and 200° C., under a flow of air, wherein said catalyst has a content of metal M1 between 0.01 and 5% by weight, a content of the promoter M2 between 0.5 and 10% by weight, and promoter M2 is an element selected from group 11, 13 or 14 of the periodic table.

* * * * *